United States Patent
Montgomery et al.

(10) Patent No.: US 7,139,396 B2
(45) Date of Patent: Nov. 21, 2006

(54) KOBLITZ EXPONENTIATION WITH BUCKETING

(75) Inventors: Peter L. Montgomery, San Rafael, CA (US); Kristin Estella Lauter, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 841 days.

(21) Appl. No.: 10/184,737

(22) Filed: Jun. 27, 2002

(65) Prior Publication Data

US 2004/0005054 A1 Jan. 8, 2004

(51) Int. Cl.
*H04L 9/30* (2006.01)
(52) U.S. Cl. .......................... 380/30; 380/28
(58) Field of Classification Search ............ 380/28, 380/29
See application file for complete search history.

(56) References Cited

U.S. PATENT DOCUMENTS

2002/0041681 A1* 4/2002 Hoffstein et al. ........... 380/28

2002/0044649 A1 4/2002 Gallant et al.

OTHER PUBLICATIONS

Solinas, Jerome A.; "Efficient Implementation of Koblitz Curves and Generalized Mersenne Arithmetic"; Nov. 3, 1999; ECC '99; Slies 1-25; http://cacr.math.uwaterloo.ca; retrieved Dec. 8, 2005.*
Smart, Nigel P; "Elliptic Curves Over Small Fields of Odd Characteristics"; Oct. 1997; Hewlett-Packard Company; pp. 1-10.*

* cited by examiner

*Primary Examiner*—Gilberto Barron
*Assistant Examiner*—Jung Kim
(74) *Attorney, Agent, or Firm*—Lee & Hayes, PLLC

(57) ABSTRACT

An implementation of a technology, described herein, for facilitating cryptographic systems and techniques. At least one implementation, described herein, maximizes the speed and security of fast exponentiation while minimizing its expense. At least one implementation, described herein, employs elliptic curves with a fast exponentiation technique so that it maximizes speed and security while minimizing expense. At least one implementation, described herein, employs Koblitz exponentiation with "bucketing" techniques to maximize speed and security of cryptosystems while minimizing expense of such techniques. This abstract itself is not intended to limit the scope of this patent. The scope of the present invention is pointed out in the appending claims.

10 Claims, 3 Drawing Sheets

*(Background)*

KOBLITZ EXPONENTIATION WITH BUCKETING

TECHNICAL FIELD

This invention generally relates to a technology for facilitating cryptographic systems and techniques.

BACKGROUND

Cryptographic systems—such as those of the Public-Key Infrastructure (PKI)—often involve raising elements of some group to large powers. Examples of groups include the symmetries of a geometrical object, the integers modulo a positive integer N under addition (Z/NZ), and elliptic curves. The task of raising elements of some group to (possibly) large powers is called "exponentiation". Exponentiation is a central and expensive part of many cryptographic protocols.

Mathematically, exponentiation may be described as thus:
Let G be a group with multiplicative operator.
Given $g \in G$ and an integer n, compute $g^n$.

The meaning of $g^n$ may be found in abstract algebra books. When n>0, it denotes the product ggg . . . g, with n copies of g being multiplied together (thus n−1 applications of ()). The definition of group requires to be associative. This exponentiation obeys the algebraic laws $g^m g^n = g^{m+n}$ and $(g^m)^n = g^{mn}$ for arbitrary integers m and n. Within an abelian (=commutative) group or subgroup (the case of interest herein) exponentiation also satisfies $(gh)^n = g^n h^n$.

Three common exponentiation scenarios:
g is fixed and n varies (e.g., first phase of Diffie-Hellman);
g varies and n is fixed (e.g., RSA);
both g and n vary (e.g., second phase of Diffie-Hellman).

Generally, the security of a cryptographic system is based, at least in part, on exponentiation being difficult to invert. That means that it is extraordinarily difficult to determine the original operands based upon the results of such exponentiation. The discrete logarithm problem tries to find n given g and $g^n$. The Diffie-Hellman protocol uses groups in which this problem is believed to be hard. Other protocols may employ groups of unknown order (=number of elements), in which case it may be hard to find g given n and $g^n$.

The following references discuss various exponentiation techniques (particularly those in relation to cryptography):
Donald E. Knuth, "The Art of Computer Programming", Volume 2, Seminumerical Algorithms, 3rd edition, Addison-Wesley, 1997.
IEEE Standard Specifications for Public-Key Cryptography, IEEE Std 1363-2000, IEEE Computer Society, 29 Aug. 2000.

| Some Mathematical Notation Used Herein | |
|---|---|
| $B_j$ | Contents of bucket j, typically the product of several items related to the subscript j. |
| $C_w$ | For fixed w, a fixed subset of $Z[\tau]$ containing small-norm representatives of certain residue classes modulo $\tau^w$. |
| ceil(x) | Ceiling function: the least integer n such that $n \geq x$, where x is real. |
| E | An elliptic curve equation. |
| $E_{a,b}$ | The elliptic curve $y^2 + xy = x^3 + ax^2 + b$ over a field of characteristic 2. |
| floor(x) | Floor function: the largest integer n such that $n \leq x$, where x is real. |
| GF(q) | Field with q elements, where q is a prime or prime power. |
| I | Identity function (I(P) = P for all P), on elliptic curve group. |
| $\log_2(x)$ | Real base 2 logarithm of x, where x is real, x > 0. |
| m | An integer. Used for extension degree in $GF(2^m)$. |
| μ | $(-1)^{a+1}$ where a is taken from elliptic curve equation (EK). |
| n | An integer, usually an exponent. |
| p | A prime. |
| P | Point on an elliptic curve. |
| Q | Field of rational numbers. |
| Q(τ) | Field generated by τ. Contains all a + bτ where a, b ∈ Q. |
| $T_{frob}$ | Frobenius endomorphism: $T_{frob}((x, y)) = (x^p, y^p)$. |
| T | An endomorphism on Koblitz curves, satisfying $T^2 - T + 2I = 0$. Same as $\mu T_{frob}$. |
| τ | An algebraic integer, specifically one satisfying $\tau^2 - \tau + 2 = 0$. |
| Z | Ring of integers. |
| Z[τ] | Ring of integers generated by τ. Contains all a + bτ where a, b ∈ Z. |
| 0 | Identity element (point at infinity) in an elliptic curve group. |
| +, −, ± | Addition and subtraction operators in elliptic curve group. |
| ⊗ | Multiplication operator in abstract group. |

Fast Exponentiation

Often, the speed of an exponentiation determines its practicality. Various factors affect the speed and efficiency of exponentiation. Such factors include: which group or other algebraic system is being used, the hardware the system is implemented on, and whether one element is repeatedly being raised to different powers, different elements are raised to a fixed power, or both the powers and the base elements vary.

Binary Techniques of Exponentiation

Many of the binary techniques of exponentiation are well-known to those of ordinary skill in the art. They are explained in references (cited above).

Let x be an element of a multiplicative group (or a semigroup) with operator and let n be a positive integer. The problem is to compute $x^n$ while minimizing the number of multiplications. Herein, squarings (in which one knowingly multiplies an element by itself) are distinguished from other multiplications. For the sake of clarity and simplicity, the description, herein, assumes the time per multiplication (or squaring) is independent of the values being multiplied (or squared).

A naive technique successively computes $x^2 = xx$, $x^3 = x^2 x$, $x^4 = x^3 x$, . . . , $x^n = x^{n-1} x$. This takes n−1 group multiplications. It is acceptable for small n (e.g., n<20) but totally impractical when the exponent has 100 or more bits, as may happen in cryptographic applications.

Fortunately, one may lower the operation count from O(n) to $O(\log_2(n))$ using associativity. For example, one may skip the computation of $x^3$ and proceed directly to $x^4 = x^2 x^2$. The square-and-multiply technique, also called the left-to-right binary technique, uses at most $floor(\log_2(n))$ squarings and $floor(\log_2(n))$ additional multiplications. One may implement it by scanning the binary representation of n.

For example, if $n = 1234567$ $= 1048576 + 131072 + 32768 + 16384 + 4096 + 1024 + 512 + 128 + 4 + 2 + 1$ $= (100101101011010000111)_2,$ then the square-and-multiply technique successively computes $x^k$ for k=
2,
4,
8, 9,
18,
36, 37,
74, 75,
150,
300, 301,
602,
1204, 1205,
2410, 2411,
4822,
9644, 9645,
19290,
38580,
77160,
154320,
308640, 308641,
617282, 617283,
1234566, 1234567.

Each bit in the binary expansion of 1234567 (excluding the leading 1) corresponds to one line above. The lines corresponding to a 1-bit represent a squaring and a multiplication. The lines corresponding to a 0-bit represent only a squaring. The algorithm uses 20 squarings and 10 additional multiplications, far fewer than the 1234566 multiplications needed by the naive technique. The square-and-multiply technique needs only one temporary, to hold the latest power of x.

The last table becomes an addition chain if one prepends a one ("1") up front. An addition chain for n is a sequence of integers, starting with 1 and ending with n, such that every element after the 1 is the sum of two (not necessarily distinct) earlier elements. An addition-subtraction chain for n is similar but allows subtractions: each element after the 1 is the sum or difference of two earlier elements.

Another binary technique of exponentiation forms the powers $x, x^2, x^4, x^8, \ldots, x^{1048576}$, where the exponents are powers of 2. Use the binary representation of n to select which subset of these to multiply together to get $x^n$. In this case $$x^{1234567} = xx^2x^4x^{128}x^{512}x^{1024}x^{4096}x^{16384}x^{32768}x^{131072}x^{1048576}. \quad (*)$$

This technique, called the right-to-left binary technique of exponentiation, also takes 20 squarings and 10 general multiplications. Two temporaries suffice: one to hold powers $x^{2^k}$ and one to hold the partial product.

If the right-to-left binary technique is used multiple times, with the same x but different n, then the repeated squarings need be done only once. For example, if one already knows $x^{2^k}$ for $0 \leq k \leq 20$, then 10 general multiplications suffice to get $x^{1234567}$ by (*).

Windowing

A $2^k$ary technique (also known as radix $2^k$) partitions the exponent into blocks of k adjacent bits. It processes these k bits by raising the prior result to the power $2^k$, then multiplies the intermediate result by the contribution from the k latest bits. It is also explained in several of the above-cited references including Gordon (1998) and Knuth, p. 464.

Elliptic Curves

One family of groups used for cryptosystems is elliptic curves. Their popularity is partially based upon there being no index calculus method known to solve the discrete logarithm problem in most elliptic curve groups; therefore, a smaller key length seems to be secure. However, their main computational drawback is that adding two points on an elliptic curve typically involves several expensive multiplication operations—meaning that it takes more time and resources to process it.

In some algebraic systems, such as elliptic curve groups, two independent operations may be done more cheaply than two similar operations where the output of the first operation is an operand to the second operation. That is, it may be less expensive to compute $x_1x_2$ and $x_3x_4$ together than to compute $x_1x_2$ followed by $(x_1x_2)x_3$. The right-to-left binary technique lets one overlap (for example) the computations of $x^{135} = x^7 x^{128}$ and $x^{256} = x^{128} x^{128}$.

For the purpose of secure communications, elliptic curves may be used for implementations of the public-key infrastructure (PKI). In such a scenario, two network-connected nodes (such as a client and a server) know a common elliptic curve and a base point. The two nodes perform a "key exchange". This may be done to accomplish a secure communications channel, for example, when deciding on a secret key to use for a "block cipher."

Typically, in order to accomplish a key exchange between two such nodes, each node selects an apparently random and extraordinarily large power. Each node raises the (shared) base point g to its selected power. The results are exchanged and each node raises the other node's result to its own large power. Suppose one node chooses m as its large power and the other chooses n. Due to the group identity $(g^m)^n = g^{mn} = (g^n)^m$, both nodes know $g^{mn}$, which can serve as a common key. Although the data being exchanged ($g^m$ and $g^n$) are exposed along the communications path, the ultimate results ($g^{mn}$) are secure because only the nodes know which "large powers" (m and n) have been used.

Koblitz Curves

One special case of elliptic curves is Koblitz curves. These curves are defined over a subfield, which means the coefficients of the defining equation are in a small subfield of a large field, but the group used for the cryptosystem is the group of points over the larger field. The term Koblitz curves usually refers to curves defined over the binary field of two elements, and they are also called anomalous binary curves. These curves appear in standards documents such as FIPS186 below.

The following references discuss elliptic curves (and/or Koblitz curves) particularly with respect to exponentiation:

[FIPS186] "Recommended Elliptic Curves for Federal Government Use", in Appendix 6 to FIPS 186-2 "Digital Signature Standard (DSS), 2000 Jan. 2000. (Search at http:/csrc.nist.gov/encryption).

[SOLINAS] Jerome A. Solinas, "Efficient Implementation of Koblitz Curves and Generalized Mersenne Arithmetic". Presented at the $3^{rd}$ Workshop on Elliptic Curve Cryptography (ECC1999), held in Waterloo, Ontario, Canada, Nov. 1–3, 1999. For slides, go to http://cacr.math.uwaterloo.ca—select conferences.

The Challenge of Fast Exponentiation

Accordingly, it is a challenge to increase the speed and efficiency cryptography for secure communications, such as that within the PKI. Furthermore, it is a challenge to maximize the speed and security of fast exponentiation while minimizing its expense. Further still, it is a challenge to employ elliptic curves with a fast exponentiation technique so that it maximizes speed and security while minimizing expense.

SUMMARY

Described herein is a technology for improving implementation of cryptographic protocols.

At least one implementation, described herein, maximizes the speed and security of fast exponentiation while minimizing its expense. At least one implementation, described herein, employs elliptic curves with a fast exponentiation technique so that it maximizes speed and security while minimizing expense. At least one implementation, described herein, employs Koblitz exponentiation with "bucketing" techniques to maximize speed and security of cryptosystems while minimizing expense of such techniques.

This summary itself is not intended to limit the scope of this patent. Moreover, the title of this patent is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific exemplary details. In other instances, well-known features are omitted or simplified to clarify the description of the exemplary implementations of present invention, thereby better explain the present invention. Furthermore, for ease of understanding, certain method steps are delineated as separate steps; however, these separately delineated steps should not be construed as necessarily order dependent in their performance.

The following description sets forth one or more exemplary implementations of a Koblitz Exponentiation with Bucketing incorporate elements recited in the appended claims. These implementations are described with specificity in order to meet statutory written description, enablement, and best-mode requirements. However, the description itself is not intended to limit the scope of this patent.

The inventors intend these exemplary implementations to be examples. The inventors do not intend these exemplary implementations to limit the scope of the claimed present invention. Rather, the inventors have contemplated that the claimed present invention might also be embodied and implemented in other ways, in conjunction with other present or future technologies.

An example of an embodiment of a Koblitz Exponentiation with Bucketing may be referred to as an "exemplary exponentiator."

Introduction

Figure 3:
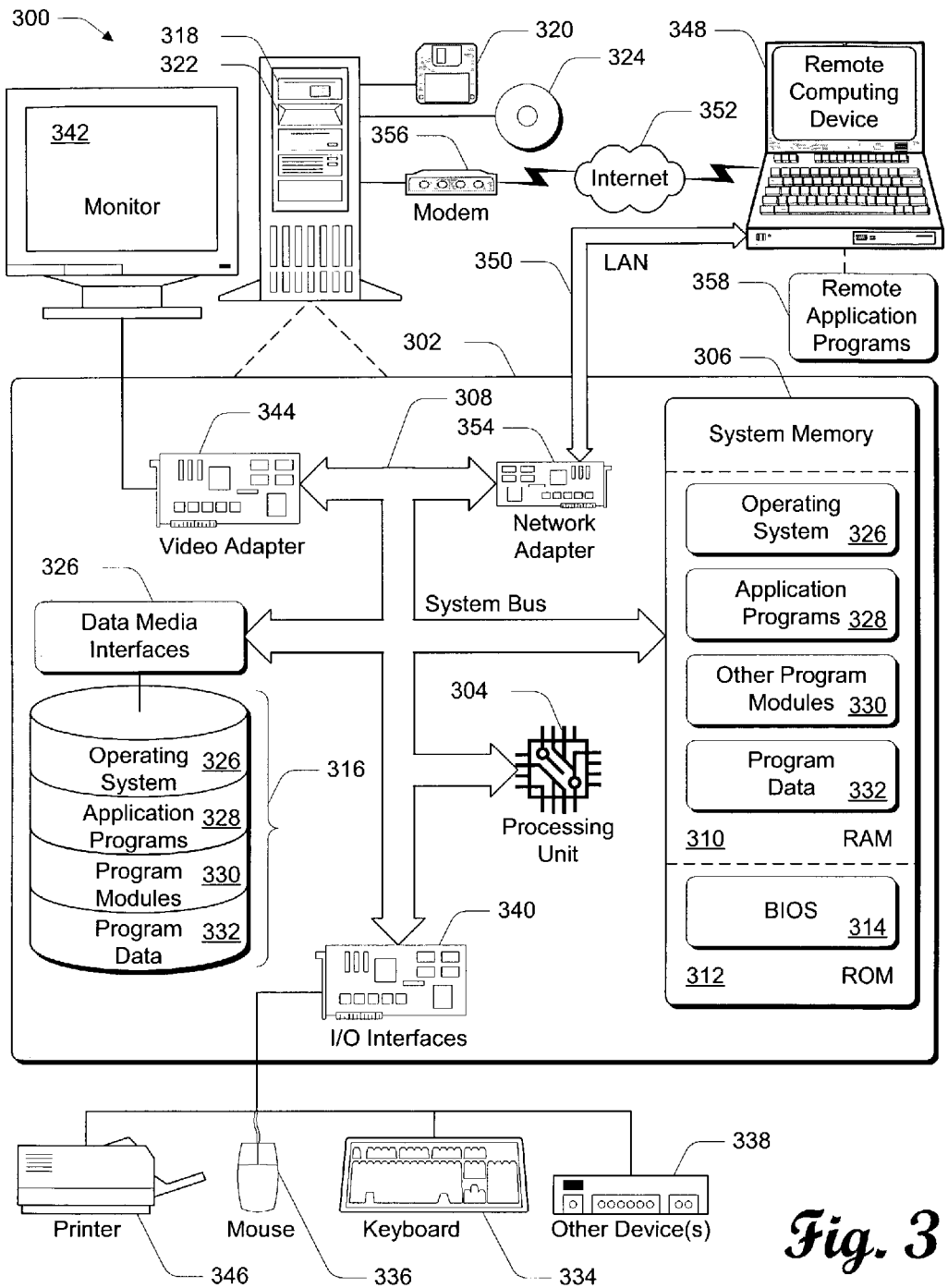
FIG. 3 is an example of a computing operating environment capable of implementing at least one embodiment (wholly or partially) described herein.

The exemplary exponentiator may be implemented on computing systems and computer networks like that shown in FIG. 3. Although the exemplary exponentiator may have many applications, cryptosystems and cryptoprocessing are examples of particular applications.

Generally, the exemplary exponentiator maximizes the speed and security of fast exponentiation while minimizing its expense. The exemplary exponentiator operates on certain elliptic curves with a fast exponentiation technique. The exemplary exponentiator implements Koblitz exponentiation with "bucketing" techniques to maximize speed and security of cryptosystems while minimizing expense of such techniques.

Let $\tau$ be an algebraic integer (i.e., complex number) satisfying $\tau^2 - \tau + 2 = 0$. Given $\alpha \in Z[\tau]$ (the ring generated by $\tau$ which contains all elements of the form $a + b\tau$ where $a, b \in Z$) and a fixed positive integer $w$, the exemplary exponentiator may reduce $\alpha$ modulo $\tau^w$ and identify which element $c$ from a fixed set satisfies $\alpha \equiv c \pmod{\tau^w}$.

Furthermore, the exemplary exponentiator may form a Frobenius expansion with powers of $\tau$ and these c's as coefficients. Further still, the exemplary exponentiator may partition this expansion into buckets (i.e., collections of elements) by gathering terms with matching coefficients (where matching means coefficients are equal or negatives of each other).

Moreover, the exemplary exponentiator may perform multiple curve additions simultaneously as the contents of each bucket (i.e., collection of elements) are being merged into a single output, thereby saving numerous field inversions ("multiple bucket insertions"). The exemplary exponentiator may also merge buckets in a highly efficient way ("efficient bucket merging").

Higher-Radix Windowing Techniques

The left-to-right binary exponentiation windowing technique generalizes to an m-ary technique for integer $m \geq 2$, by writing the exponent n in base m and starting with a table of $x^0, x^1, \ldots, x^{m-1}$. For example, if $$n = 1234567 = (10231122013)_4$$

then n has nine nonzero base-4 digits. One may compute $x^n$ using the addition chain 1, 2, 3, 4,
8, 16, 18,
36, 72, 75,
150, 300, 301,
602, 1204, 1205,
2410, 4820, 4822,
9644, 19288, 19290,
38580, 77160,
154320, 308640, 308641,
617282, 1234564, 1234567

Each line after the first represents two squarings and possibly another multiplication. In this example, there are 20 squarings and 9 general multiplications. This is a slight savings from the binary techniques.

When m is a power of 2, one may restrict this table to odd powers of x through $x^{m-1}$. Write the exponent as $$n = 1234567 =$$
$$1048576 + 131072 + 3*16384 + 4096 = 3*512 + 128 + 4 + 3*1$$

where all nonzero coefficients are 1 or 3, while avoiding nonzero coefficients on two consecutive powers of 2. (Unlike the base-4 expansion of 1234567, this expansion has small multiples of $2^7$, $2^9$, and $2^{17}$.) Some authors call this a width-2 window, because there are at least 2 squarings separating each pair of non-squarings after the table is built. One may use the following addition chain:

1, 2, 3, 4,
8, 9,
18, 36, 72, 75,
150, 300, 301,
602, 1204, 1205,
2410, 2411,
4822, 9644, 9645,
19290, 38580, 77160, 154320, 308640, 308641,
617282, 1234564, 1234567.

Although one computes $x^2$, one need not save it past the first line. Each line after the first represents several squarings and one multiplication by x or $x^3$. In this example, the windowing yields no improvement over radix-4, costing 20 squarings and 9 general multiplications.

Bucketing

Figure 1:
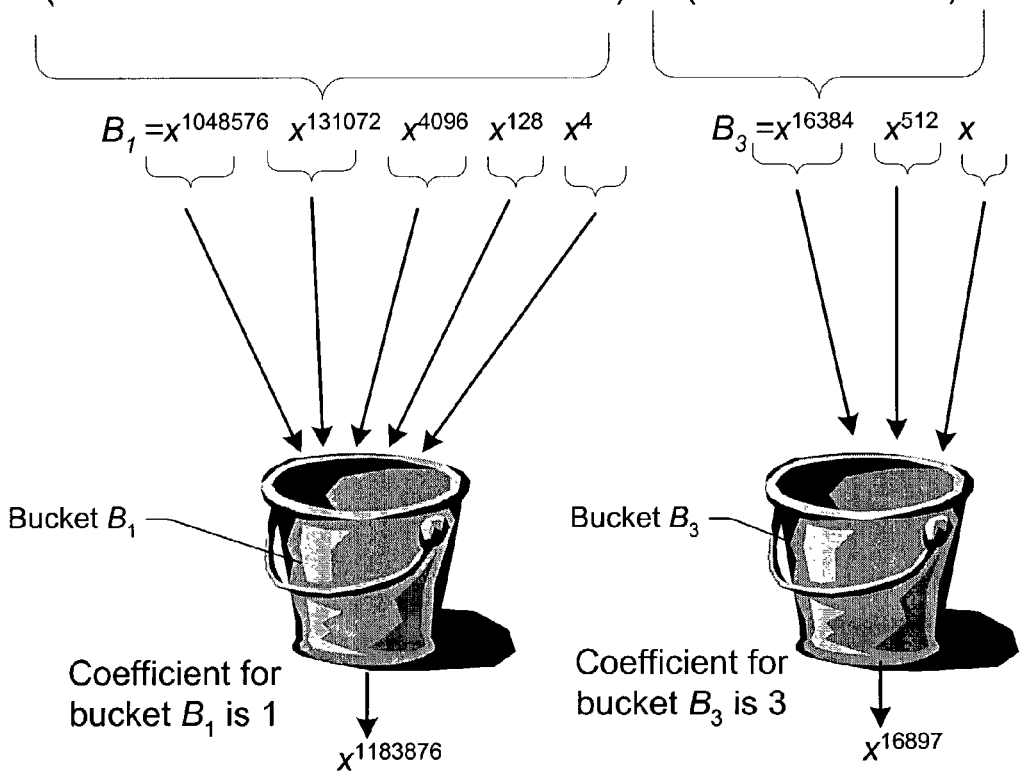
FIG. 1 is a block diagram graphically illustrating actions performed by an embodiment described herein and some of the components manipulated by such.

Bucketing can be used to improve upon windowing techniques. The idea behind bucketing is to collect the powers of 2 according to their coefficients. An example appears in FIG. 1, where n=1234567. That means that n=1*(1048576+131072+4096+128+4)+3*(16384+512+1). Since there are two coefficients (1 and 3), two buckets (i.e., collections of elements) are formed: $B_1$ and $B_3$. In each bucket are placed those elements that have the associated coefficient.

$$B_1 = x^4 x^{128} x^{4096} x^{131072} x^{1048576}$$

$$B_3 = xx^{512} x^{16384}$$

The desired result is $x^n = B_1^1 B_3^3$.

The bucket terminology is chosen because one may envision, for example, collecting the values of x, $x^{512}$, and $x^{16384}$ into a "bucket" for $B_3$. When retrieving the contents of this "bucket," one gets the product $x^{16897}$—which is the product of the collection x, $x^{512}$, and $x^{16384}$ within the bucket.

The multiplications used to form an individual $B_i$ may be done in arbitrary order, possibly on a different processor than that being used for the squarings. One may need 20 squarings to compute all $x^{2^k}$ for $k \leq 20$, six more multiplications for $B_1$ and $B_3$, two more multiplications and one squaring for $B_1 B_3^3$. In this example, one may use 21 squarings and 8 multiplications.

Asymptotically, the radix ($2^k$)-ary techniques (both left-to-right and right-to-left) average about $\log_2(n)$ squarings and $2^{k-1} + \log_2(n)/(k+1)$ additional multiplications. The optimal k will depend on n.

The Knuth (1997) reference (2nd edition, Exercise 4.6.3-9 "Design an exponentiation procedure . . . ", pp. 482 and 692.) provides an example of a conventional technique for determining a bucket's contents within the realm of binary exponentiation. In general, if $m=2^k$ where k>1, the right-to-left m-ary technique has an invariant.

$$x^n = B_1^1 B_3^3 \ldots B_{m-1}^{m-1} \text{xpower}^{nleft} \quad (I)$$

where the exponent nleft decreases on successive iterations. Initially xpower=x, nleft=n, and all $B_i$ are 1 (the group identity element). If nleft=0, then $\text{xpower}^{nleft}=1$ and the first phase is over. If nleft is even and nonzero, replace $\text{xpower}^{nleft}$ by $(\text{xpowerxpower})^{nleft/2}$ (a squaring). If nleft is odd, choose a subscript i≡nleft (mod m). Replace $B_i$ by $B_i$xpower (a multiplication, unless $B_i=1$) and nleft by nleft−i (thereby ensuring at least k successive squarings are upcoming, if nleft>i).

After finishing the first phase, so nleft=0, an additional m−1 multiplications suffice to form $x^n$ from the bucket outputs, as described in Knuth.

Mixing Multiplication and Divisions

All collection elements have multiplicative inverses, ensuring division is always possible. If one assumes that this division (or inversion) is straightforward (i.e., computationally easy), then the ($2^k$)-ary techniques may be modified to allow negative digits in their representation of n. The revised algorithm bounds the digits by $2^{k-1}$ in absolute value rather than taking odd values from 1 to $2^k-1$. The ($2^k$)-ary techniques write n as sums of powers of 2 times these small (possibly negative) coefficients, while avoiding two powers of 2 whose exponents differ by k or less. For example, the 8-ary technique expands 1234567 as

1234567=1048576+131072+3*16384+3*2048−3*128+8−1.

This leads to the following (left-to-right) addition-subtraction chain:

1, 2, 3, 4, 8, 9,
18, 36, 72, 75,
150, 300, 600, 603,
1206, 2412, 4824, 9648, 9645, (subtract 3 here)
19290, 38580, 77160, 154320, 154321,
308642, 617284, 1234568, 1234567 (subtract 1 here)

This example represents 20 squarings and 7 multiplications or divisions. The top line may be optimized to 1, 2, 3, 6, 9, saving a squaring. An example of the right-to left analogue is this (with negative exponents where an element is inverted):

$B_1 = x^{1048576} \otimes x^{131072} \otimes x^8 \otimes x^{-1}$   $(=x^{1179655})$
$B_3 = x^{16384} \otimes x^{2048} \otimes x^{-128}$   $(=x^{18304})$
$x^n = B_1 \otimes B_3^3$   $(=x^{1179655} \otimes x^{54912} = x^{1234567})$.

In this example, it takes 21 squarings and 7 additional multiplications or divisions, but it may be optimized to save two squarings, after replacing 1048576+131072 by 3*262144+3*131072:

$$B_1 = x^8 x^{-1}$$

$$B_3 = x^{262144} x^{131072} x^{16384} x^{2048} x^{-128}$$

$$x^n = B_1 B_3^3.$$

For the right-to-left ($2^k$)-ary technique, where k>1, the bucket indices (here 1 and 3) may be odd values from 1 to $2^{k-1}-1$. If nleft≡i (mod $2^k$) where i is odd and $0<i<2^{k-1}$, one inserts xpower into $B_i$ as before, while replacing nleft by nleft−i. But if i is odd and $2^{k-1}<i<2^k$, one inserts xpower$^{-1}$ into $B_{-j}$ where $j=i-2^k$ (a division by xpower), while replacing nleft by nleft−j. The absolute value of nleft may temporarily increase, but its new value will be divisible by $2^k$.

Hereafter, references to these ($2^k$)-ary techniques may employ signed digits.

Elliptic Curves Over GF($2^m$)

Set p=2. Let m be a positive integer. (Note that this m is unrelated to the m that was used in earlier sections for m-ary techniques.) Let a, b in GF($2^m$) (the field of $2^m$ elements) with b≠0. The elliptic curve $E=E_{a,b}$ over GF($2^m$) is the set of all ordered pairs (x, y) in GF($2^m$)×GF($2^m$) such that $$E: y^2 + xy = x^3 + ax^2 + b, \quad (E)$$

together with a special point called the point at infinity.

It is well-known to those of skill in the art that the points on E form an abelian group under an appropriate operation.

Henceforth, we use dark black additive operators (+, −, ±) symbols for addition and subtraction operations on elliptic curve groups, rather than the multiplication () operator used hereto. The − is also a unary operator, for inversion (negation) in the group. We use O for the group identity element (=point at infinity).

If n is a positive integer and P is a point on E, then nP denotes

P+P+ . . . +P, where n copies of P are being summed. If n<0, then nP denotes −((−n)P)=(−n)(−P). If n=0, then nP=O. These are standard definitions for abelian groups. Note that below, herein, multiplicative notation for group operations has been replaced with an additive notation for such operations. In particular, since it is straightforward to form −P from P in an elliptic curve group, the modifications mentioned above in the "Mixing Multiplications and Divisions" section apply. One may call n an exponent.

Reducing Field Inversions

If $P_1=(x_1, y_1)$ and $P_2=(x_2, y_2)$ are two points on E (neither being O) with $x_1 \neq x_2$, then forming either $P_1+P_2$ or $P_1-P_2$ requires a division (over GF($2^m$)) by $x_1-x_2$ when using affine coordinates. Specifically, $P_1+P_2=(x_3, y_3)$ where $$\lambda = (y_1-y_2)/(x_1-x_2)$$

$$x_3 = \lambda^2 + \lambda - a - x_1 - x_2$$

$$y_3 = -(x_3-x_1)\lambda - y_1 - x_3.$$

To get $P_1-P_2=P_1+(-P_2)$, replace $y_2$ by $-x_2-y_2$ in the numerator of λ.

There is also a division needed to add $P_1$ to itself (i.e., $P_1+P_1$) when $x_1 \neq 0$.

Each field division translates into a field inversion and a multiplication. Sometimes one may avoid an inversion. One may identify two such cases here:

a) To form both $P_1 \pm P_2$ given $P_1$ and $P_2$, two divisions by $x_1-x_2$ are necessary. Although $(x_1-x_2)^{-1}$ is used twice, it need be computed only once.

b) If we need to invert two field elements $z_1$ and $z_2$ where neither depends upon the inverse of the other, then one may compute both by inverting the product $z_1 z_2$ and doing two additional multiplications:

$$z_1^{-1} = z_2(z_1 z_2)^{-1} \text{ and } z_2^{-1} = z_1(z_1 z_2)^{-1}.$$

This technique allows one, for example, to do two independent elliptic curve additions $P_1+P_2$ and $P_3+P_4$ with one field inversion exchanged for three field multiplications. More generally, one may replace k independent inversions by 1 inversion and 3(k−1) multiplications. Depending upon the relative costs of multiplication and inversion (in the field), this trade may reduce the overall computational cost.

Koblitz Curves Over GF($2^m$)

Again, set p=2. When both a and b in (E) are in the base field GF(2), the curve (E) is called a Koblitz curve. Some call it an Anomalous Binary Curve. The defining equation becomes:

| | |
|---|---|
| (EK) E: $y^2 + xy = x^3 + ax^2 + 1$ | (a = 0 or a = 1) |

Define the Frobenius endomorphism $T_{frob}$ on E(algebraic closure of GF(p)) by $$T_{frob}((x,y)) = (x^p, y^p)$$

and $T_{frob}(O)=O$. This transform satisfies a characteristic polynomial $$T_{frob}^2 + (-\mu)T_{frob} + pI = O$$

where $\mu=(-1)^{a+1}$ and where I denotes the identity transform. That is, if P is an arbitrary point on the curve (perhaps over an extension field) then $$T_{frob}(T_{frob}(P)) + ((-\mu)T_{frob}(P)) + pP = O.$$

Fix an extension degree m>1 (m is usually an odd prime). Look at the curve (EK) over GF($p^m$). Many such fields appear in the standards. The NIST-recommended Koblitz curves [FIBS186] have $p^m=2^m$ for m=163, 233, 283, 409, 571.

When restricted to GF($p^m$), the Frobenius endomorphism $T_{frob}$ satisfies two known polynomial identities:

| | |
|---|---|
| $T_{frob}^m = I$ | (because $x^{p^m} = x$ for all x in GF($p^m$)) |
| $T_{frob}^2 + (-\mu)T_{frob} + pI = 0$ | (characteristic polynomial). |

To simplify the upcoming formulae, denote $T=\mu T_{frob}$. Then (since p=2 and $\mu^2=1$):

$$T^m = \mu^m I (= \pm I)$$

$$T^2 - T + 2I = O$$

$T(P_1+P_2)=T(P_1)+T(P_2)$ for arbitrary $P_1$, $P_2$ on the curve.

Expanding Koblitz Exponent as Sum of Powers of τ

Let n be an integer exponent, supplied by the application.

Given a point P on (EK) over $GF(p^m)$, one may want nP.

If $F(X) \in Z[X]$ is any polynomial with integer coefficients such that $F(X)-n$ is in the ideal $(X^m-\mu^m, X^2-X+2)$ then $F(T)P=nP$ for all P on (EK), over $GF(2^m)$. It will suffice to compute $F(T)P$ instead.

(If k is a nonnegative integer, then $T^k P$ denotes the result of applying the operator T k times to P. If $F(X) = \Sigma_{0 \le k \le d} a_k X^k$, then $F(T)P = \Sigma_{0 \le k \le d} a_k T^k P$, using + to evaluate the $\Sigma$ on the right. These are conventional definitions.)

Those of skill in the art (as illustrated in [SOLINAS]) know how to expand the exponent n as a sum of powers of the complex number $$\tau = \frac{1+\sqrt{-7}}{2},$$

with coefficients 0, ±1, while avoiding two adjacent nonzero coefficients. This seemingly mysterious $\tau$ satisfies $\tau^2 - \tau + 2 = 0$, the same quadratic equation as T.

The expansion algorithm resembles the right-to-left m-ary technique, using repeated divisions by the algebraic integer $\tau$. For example, one may find the expansion:

$1234567 = -1 - \tau^3 + \tau^5 - \tau^7 + \tau^{10} + \tau^{12} + \tau^{16} + \tau^{21} + \tau^{23} + \tau^{25} + \tau^{27} - \tau^{35} - \tau^{37} + \tau^{40} + \tau^{42}$ using coefficients ±1. Given a point P on the curve (EK), one might evaluate 1234567P as F(T) P where $F(X) = -1 - X^3 + X^5 - X^7 + X^{10} + X^{12} + X^{16} + X^{21} + X^{23} + X^{25} + X^{27} - X^{35} - X^{37} + X^{40} + X^{42}.$ Given F, the evaluation of $F(T)P$ may proceed left-to-right or right-to-left, analogously to the binary techniques, except that applications of T replace the earlier squarings. Each technique takes 42 evaluations of T (or of $T_{frob}$) and 14 additional additions or subtractions of elliptic curve points.

The definition $T = \mu T_{frob}$ references a Frobenius endomorphism. Each Frobenius evaluation costs 2 squarings in the field $GF(2^m)$ if one uses affine coordinates, 3 squarings if one uses projective coordinates. (See P1363 Reference: for descriptions of affine and projective coordinates.). The definition of T also specifies a negation when $\mu = -1$, but this negation may often be avoided by remembering the signs of intermediate results. The number of elliptic curve additions and subtractions (in this example here it is 14) is about $(2/3)\log_2(n)$.

One may observe that if the exponent n is approximately the same size as the group order (which in turn is close to the field size $p^m$), then one may often get a smaller-degree polynomial in $\tau$ by first reducing n modulo the algebraic integer $\tau^m - \mu^m$. The algorithm given by NIST incorporates this optimization, albeit with little commentary. We look for a polynomial F(X) with small coefficients such that $F(\tau) \equiv n$ (mod $\tau^m - \mu^m$). Then $F(T)P = nP$. This may reduce the degree of F from about $2\log_2(n)$ to about $\log_2(n)$, cutting the cost of evaluating $F(T)P$ almost in half.

Bucketing with Powers of $\tau$

At least one implementation of the exemplary exponentiator, described herein, performs Koblitz curve exponentiation with bucketing.

The width-w binary techniques write the exponent n as a linear combination of powers of 2, with odd (signed) coefficients from $\{\pm 1, \pm 3, \ldots, \pm(2^{w-1}-1)\}$.

Some implementations of Koblitz curve exponentiation (such as that illustrated in Solinas) utilize width-w $\tau$ expansions, but do not distinguish left-to-right from right-to-left. Nor do they employ "bucketing."

The exemplary exponentiator may perform one or more of the following functions (after fixing w and a small set $C_w \subset Z[\tau]$):

given $\alpha \in Z[\tau]$, either detect that $\alpha/\tau$ is an algebraic integer (and return this quotient), or identify an element $c \in C_w$ satisfying $\alpha \equiv c$ (mod $\tau^w$);

forming a Frobenius expansion with powers of $\tau$ and these c's (or their negatives) as coefficients;

partitioning this expansion into buckets by gathering terms with matching coefficients.

Furthermore, the exemplary exponentiator may perform one or more of the following functions:

performing multiple curve additions simultaneously as the contents of each bucket are merged into one a single output, thereby saving numerous field inversions ("multiple bucket insertions");

merging buckets in an efficient way ("efficient bucket merging").

This expansion may generalize a right-to-left technique and may be illustrated by this example:

$1234567 = B_1(\tau) + (1-\tau)B_3(\tau)$ where $B_1(\tau) = -1 + \tau^{11} + \tau^{16}$ $B_3(\tau) = \tau^3 - \tau^6 - \tau^{21} - \tau^{25} + \tau^{35} - \tau^{40}.$ Applying this to P, with $\tau$ replaced by T, one may get $$1234567P = (B_1(T) + (I-T)B_3(T))P$$
$$= B_1(T)P + (I-T)B_3(T)P$$
$$= (-P + T^{11}P + T^{16}P) +$$
$$(I-T)(T^3P - T^6P - T^{21}P - T^{25}P + T^{35}P - T^{40}P)$$

40 applications of T and 7 additional additions or subtractions suffice to get $B_1(T)P$ and $B_3(T)P$. One more application of T and 2 group additions or subtractions suffice to complete $B_1(T)P + (I-T)B_3(T)P$. The total is 41 applications of T and 9 additions or subtractions, which is an improvement over the 42 Frobenius applications and the 14 curve additions or subtractions needed with the conventional techniques (which did not employ bucketing).

This results in a significant improvement in performance. In this example, 14 additions/subtractions are reduced to 9. That is an improvement of about 35%.

In general, one may choose a width w, typically w=5 for m near 200 and w=6 for m near 500. One may fix a set $C_w$ with $2^{w-1}+1$ allowed coefficients, one of which is zero. The last example (w=3) had $C_3 = \{0, \pm 1, \pm(1-\tau)\}$. Each $c \in C_w$ has the form $c' + c''\tau$ for small integers c', c''. Specifically, when w=5, the $C_w$ of this example might include:

| | | |
|---|---|---|
| $c_1 = 1$ | squared norm 1 (squared norm == squared complex absolute value) | |
| $c_3 = -3 + \tau$ | squared norm 8 | |
| $c_5 = -1 + \tau$ | squared norm 2 | |
| $c_7 = 1 + \tau$ | squared norm 4 | |
| $c_9 = -3 + 2\tau$ | squared norm 11 | |
| $c_{11} = -1 + 2\tau$ | squared norm 7 | |

-continued

| | |
|---|---|
| $c_{13} = 1 + 2\tau$ | squared norm 11 |
| $c_{15} = 1 - 3\tau$ | squared norm 16 | and their negatives, plus zero. The $c_i$ have been chosen so that $c_i \equiv i \pmod{32}$ for all odd i, under the 2-adic homomorphism $\tau \to 6 \pmod{32}$. Since $\tau^5 = 6-\tau$ and $\tau^5(1-\tau)^5 = 32$, one also has $c_i \equiv i \pmod{\tau^5}$.

When w=6, the $C_6$ of this example might include:

| | |
|---|---|
| $c_1 = 1$ | squared norm 1 |
| $c_3 = 3$ | squared norm 9 |
| $c_5 = 5$ | squared norm 25 |
| $c_7 = -5 + 2\tau$ | squared norm 23 |
| $c_9 = -3 + 2\tau$ | squared norm 11 |
| $c_{11} = -1 + 2\tau$ | squared norm 7 |
| $c_{13} = 1 + 2\tau$ | squared norm 11 |
| $c_{15} = 1 - 3\tau$ | squared norm 16 |
| $c_{17} = 3 - 3\tau$ | squared norm 18 |
| $c_{19} = 5 - 3\tau$ | squared norm 28 |
| $c_{21} = -3 + 4\tau$ | squared norm 29 |
| $c_{23} = -3 - \tau$ | squared norm 14 |
| $c_{25} = -1 - \tau$ | squared norm 4 |
| $c_{27} = 1 - \tau$ | squared norm 2 |
| $c_{29} = 3 - \tau$ | squared norm 8 |
| $c_{31} = 5 - \tau$ | squared norm 22 | and their negatives, plus zero. Here $c_i \equiv i \pmod{64}$ for all i, under $\tau \to 38 \pmod{64}$. Equivalently $c_i \equiv i \pmod{\tau^6}$.

Observe that the largest squared norm is 16 (for $c_{15}$) when w=5 and 29 (for $c_{21}$) when w=6. This maximum may be kept below $$\frac{2^{w+2}}{7}.$$

Any element of the field $Q(\tau)$ is within $$\frac{2}{\sqrt{7}}$$

of an algebraic integer in $Z[\tau]$—the worst case occurs for the element $$\frac{(4\tau - 2)}{7} = \frac{2\sqrt{-7}}{7},$$

whose nearest neighbors 0, $\tau$, and $\tau-1$ are equidistant. Given an odd integer i, one choice for $c_i$ is:

$$c_i = i - \tau^w \text{ round}(i/\tau^w).$$

where round($\alpha$) (for $\alpha \in Q(\tau)$) returns an element of $Z[\tau]$ close to $\alpha$. The norm of $c_i$ is bounded by 2/sqrt(7) times the norm of $\tau^w$, the latter being $2^{w/2}$.

Here is an example of pseudo code that may be used to form an expansion, given w and $C_w$:

```
procedure Frobenius_expansion(α) // α is an algebraic integer in Z[τ]
    if (α = 0) then
        return 0;
    else if (2-adic image of α is even) then
        return τ * Frobenius_expansion(α / τ);
    else
        choose c ∈ C_w such that c ≡ α (mod τ^w);
        return c + τ^w * Frobenius_expansion((α - c) / τ^w)
end if
```

Here the multiplications by $\tau$ (resp. $\tau^w$) mean to increase all exponents within the other (recursive) expansion by 1 (resp. w).

For the example n=1234567, with w=5, one may get the expansion:

$$n = B_1(\tau) + (-3+\tau)B_3(\tau) + (-1+\tau)B_5(\tau) + (1+\tau)B_7(\tau) + (-3+2\tau)B_9(\tau) + (-1+2\tau)B_{11}(\tau) + (1+2\tau)B_{13}(\tau) + (1-3\tau)B_{15}(\tau)$$

with the following insertions into buckets:

| |
|---|
| $B_1(\tau) = \tau^{16} + \tau^{27} - \tau^{41}$ |
| $B_3(\tau) = -\tau^5$ |
| $B_5(\tau) = \tau^{10}$ |
| $B_7(\tau) = 1$ |
| $B_9(\tau) = 0$ (empty) |
| $B_{11}(\tau) = -\tau^{21}$ |
| $B_{13}(\tau) = -\tau^{35}$ |
| $B_{15}(\tau) = 0$ (empty) |

Comparing the cost with the above case where w=3, one may find that the individual buckets may be computed with just 2 curve additions or subtractions and 41 Frobenius applications. The advantage of using w=5 instead of w=3 will be apparent for larger exponents (e.g., 200 bits or more). For a 160-bit exponent, one may expect highest power $\tau^{320}$ regardless of w (highest power will drop to MIN(M, 320) if one first reduces the original exponent modulo ($\tau^m - \mu^m$)). Using w=5 will result in about 320/6≈53 bucket insertions, while w=3 will result in about 320/4≈80. With 53 insertions overall, the average bucket will have 53/8≈6.6 entries when w=5, rather than one entry each in the smaller example. Given a random exponent, the chance of an empty bucket is tiny (about exp(-6.6)≈1/500 per bucket assuming Poisson distribution). The overhead for combining additional buckets (eight rather than two) at the end is less than the 27 insertions one may save.

Merging Buckets

Suppose w=5. At the end one may want (given the earlier set $C_5$):

(BM1) $nP = B_1 + (-3I+T)B_3 + (-I+T)B_5 + (I+T)B_7 + (-3I+2T)B_9 + (-I+2T)B_{11} + (I+2T)B_{13} + (I-3T)B_{15}$ where $B_j = B_j(T)P$ denotes the result of applying the bucket's contents (after replacing $\tau$ by T) to P and summing them using the group operator. The naive way to evaluate this expression evaluates each term such as $(-3I+T)B_3$ separately, and combines the results. In the example where n=1234567, this would require 7 more Frobenius applications and 7+(0+3+1+1+3+2+2+3)=22 more curve additions or subtractions. This operation count can be reduced significantly.

As noted earlier (in section titled "Reducing Inversions"), the cost to form both $P_1 \pm P_2$ from $P_1$ and $P_2$ is less than the cost to compute these separately. One may exploit this to reduce the operation count. Forming both $P_1 \pm P_2$ at the same time will be called a joint addition/subtraction. One may first rewrite (BM1) as $$nP = B_1 + (-2I + 2T)(B_3 - B_{15}) - (I+T)(B_3 + B_{15}) +$$
$$(-I+T)B_5 + (I+T)B_7 +$$
$$(-2I + 2T)(B_{11} + B_9) + (B_{11} - B_9) +$$
$$TB_{13} + (I+T)B_{13}$$
$$= (B_1 + (B_{11} - B_9)) +$$
$$(-2I + 2T)((B_3 - B_{15}) + (B_{11} + B_9)) +$$
$$(-I + T)B_5 +$$
$$(I+T)(B_7 - (B_3 + B_{15}) + B_{13}) +$$
$$TB_{13}$$
$$= (B_1 + (B_{11} - B_9)) +$$
$$(I+T)T((B_3 - B_{15}) + (B_{11} + B_9)) +$$
$$(-I+T)B_5 +$$
$$(I+T)(B_7 - (B_3 + B_{15}) + B_{13}) +$$
$$TB_{13}.$$

Two lines are multiplied by (I+T). Replace $B_1 \leftarrow B_1 + (B_{11} - B_9)$ $B_7 \leftarrow B_7 + B_{13} - (B_3 + B_{15}) + T[(B_3 - B_{15}) + (B_{11} + B_9)]$ Two elliptic curve joint addition-subtractions, one application of T, five more additions. One may choose to start with $B_3 \pm B_{15}$ and $B_{11} \pm B_9$ because $c_3$, $c_9$, $c_{11}$, $c_{13}$, $c_{15}$ have larger squared norms than the others and because $(c_3 \pm c_{15})/2$ and $(c_{11} \pm c_9)/2$ are nice algebraic integers for the next step. The field inversion needed for $B_7 + B_{13}$ may overlap that shared by $B_{11} \pm B_9$ and that shared by $B_3 \pm B_{15}$.

At the next stage three independent additions may overlap. After applying T there is one more addition needed to update $B_7$.

The next stage computes $$nP = B_1 + (-1 + T)B_5 + (I + T)B_7 + TB_{13}$$
$$= (B_1 + (B_7 - B_5)) + T(B_{13} + (B_7 + B_5))$$

One more joint addition/subtraction $B_7 \pm B_5$, one application of T, three more additions (two of which may overlap). Merging buckets in this way saves operations. In the example n=1234567, 7 Frobenius applications may be replaced by 2 such applications, and 19 curve additions or subtractions are replaced by 8 plus 3 joint addition/subtractions.

There are many potential ways to arrange the bucket-merging computations in (BM1). We found one which uses few group operations and which exploits the reduced cost of group operations when two independent operations are done together.

Methodological Implementations of the Exemplary Exponentiator

Figure 2:
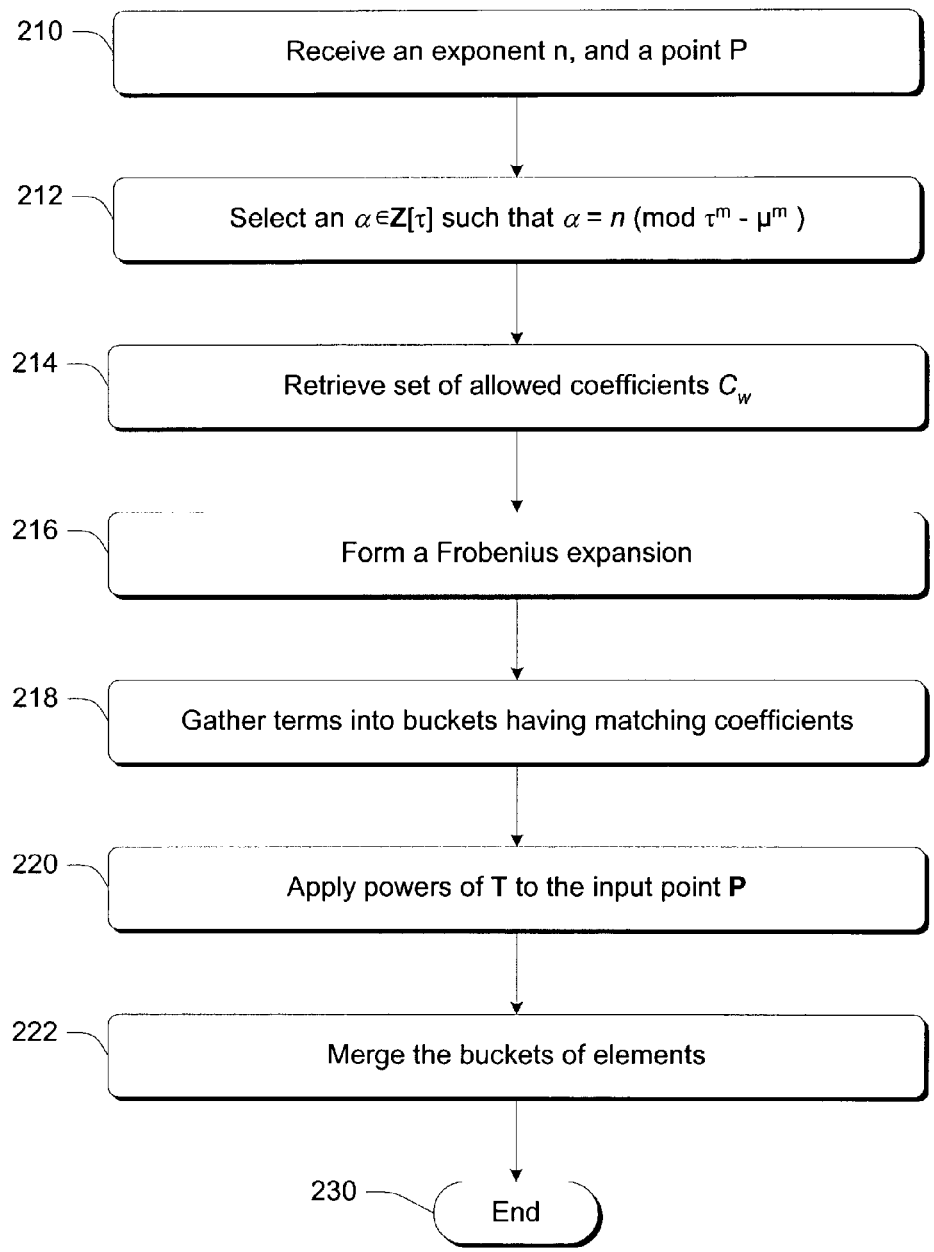
FIG. 2 is a flow diagram showing a methodological implementation described herein.

FIG. 2 shows a methodological implementation of the exemplary exponentiator. This methodological implementation may be performed in software, hardware, or a combination thereof. An example of an application for this methodological implementation is efficient elliptic curve exponentiation for Koblitz curves within the realm of cryptosystems.

At 210, the exemplary exponentiator receives an exponent n, and a point P. It knows the extension degree m. At 212, it chooses an $\alpha \in Z[\tau]$ such that $\alpha \equiv n \pmod{\tau^m - \mu^m}$. Above examples have used $\alpha \equiv n$.

The exemplary exponentiator has a set of allowed coefficients $C_w$ where w is the power of $\tau$. At 214, it retrieves that set.

At 216, it forms a Frobenius expansion $\alpha = F(\tau)$ where F is a polynomial with coefficients in $C_w$ (mostly zero coefficients). The "procedure Frobenius_expansion($\alpha$)" above provides an example of how such an expansion may be formed.

At 218, the exemplary exponentiator gathers terms of the polynomial F into buckets (i.e., sets of terms) having matching coefficients (meaning coefficients are equal or negatives thereof). Rather than the bucketing using the conventional binary expansion, the exemplary exponentiator's expansion uses powers of $\tau$. It also uses the coefficients selected above in block 216.

At 220, it applies powers of T to the input point P. Where a bucket previously had a power $\pm \tau^j$, it is replaced by the point $\pm T^j P$. Multiple points within one bucket are summed using the group law—this may be done immediately as the new points arrive, or on a delayed basis using the earlier technique for performing multiple curve additions.

At 222, after each bucket has only one point remaining, the exemplary exponentiator merges the buckets of elements. This merging may be via a straightforward (i.e., naive) technique. It may also use the technique described above to perform multiple curve additions simultaneously as the contents of each bucket are merged into one a single output, thereby saving numerous field inversions.

The process ends at 230.

Exemplary Computing System and Environment

FIG. 3 illustrates an example of a suitable computing environment 300 within which an exemplary exponentiator, as described herein, may be implemented (either fully or partially). The computing environment 300 may be utilized in the computer and network architectures described herein.

The exemplary computing environment 300 is only one example of a computing environment and is not intended to suggest any limitation as to the scope of use or functionality of the computer and network architectures. Neither should the computing environment 300 be interpreted as having any dependency or requirement relating to any one or combination of components illustrated in the exemplary computing environment 300.

The exemplary exponentiator may be implemented with numerous other general purpose or special purpose computing system environments or configurations. Examples of well-known computing systems, environments, and/or configurations that may be suitable for use include, but are not limited to, personal computers, server computers, thin clients, thick clients, handheld or laptop devices, multiprocessor systems, microprocessor-based systems, set top boxes, programmable consumer electronics, network PCs, minicomputers, mainframe computers, distributed computing environments that include any of the above systems or devices, and the like.

The exemplary exponentiator may be described in the general context of computer-executable instructions, such as program modules, being executed by a computer. Generally, program modules include routines, programs, objects, components, data structures, etc. that perform particular tasks or implement particular abstract data types. The exemplary exponentiator may also be practiced in distributed computing environments where tasks are performed by remote processing devices that are linked through a communications network. In a distributed computing environment, program modules may be located in both local and remote computer storage media including memory storage devices.

The computing environment 300 includes a general-purpose computing device in the form of a computer 302. The components of computer 902 may include, by are not limited to, one or more processors or processing units 904, a system memory 306, and a system bus 308 that couples various system components including the processor 304 to the system memory 306.

The system bus 308 represents one or more of any of several types of bus structures, including a memory bus or memory controller, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 302 typically includes a variety of computer readable media. Such media may be any available media that are accessible by computer 302 and include both volatile and non-volatile media, removable and non-removable media.

The system memory 306 includes computer readable media in the form of volatile memory, such as random access memory (RAM) 310, and/or non-volatile memory, such as read only memory (ROM) 312. A basic input/output system (BIOS) 314, containing the basic routines that help to transfer information between elements within computer 302, such as during start-up, is stored in ROM 312. RAM 310 typically contains data and/or program modules that are immediately accessible to and/or presently operated on by the processing unit 304.

Computer 302 may also include other removable/non-removable, volatile/non-volatile computer storage media. By way of example, FIG. 3 illustrates a hard disk drive 316 for reading from and writing to a non-removable, non-volatile magnetic media (not shown), a magnetic disk drive 318 for reading from and writing to a removable, non-volatile magnetic disk 320 (e.g., a "floppy disk"), and an optical disk drive 322 for reading from and/or writing to a removable, non-volatile optical disk 324 such as a CD-ROM, DVD-ROM, or other optical media. The hard disk drive 316, magnetic disk drive 318, and optical disk drive 322 are each connected to the system bus 308 by one or more data media interfaces 326. Alternatively, the hard disk drive 316, magnetic disk drive 318, and optical disk drive 322 may be connected to the system bus 908 by one or more interfaces (not shown).

The disk drives and their associated computer-readable media provide non-volatile storage of computer readable instructions, data structures, program modules, and other data for computer 302. Although the example illustrates a hard disk 316, a removable magnetic disk 320, and a removable optical disk 324, it is to be appreciated that other types of computer readable media which may store data that is accessible by a computer, such as magnetic cassettes or other magnetic storage devices, flash memory cards, CD-ROM, digital versatile disks (DVD) or other optical storage, random access memories (RAM), read-only memories (ROM), electrically erasable programmable read-only memory (EEPROM), and the like, may also be utilized to implement the exemplary computing system and environment.

Any number of program modules may be stored on the hard disk 316, magnetic disk 320, optical disk 324, ROM 312, and/or RAM 310, including by way of example, an operating system 326, one or more application programs 328, other program modules 330, and program data 332.

A user may enter commands and information into computer 302 via input devices such as a keyboard 334 and a pointing device 336 (e.g., a "mouse"). Other input devices 338 (not shown specifically) may include a microphone, joystick, game pad, satellite dish, serial port, scanner, and/or the like. These and other input devices are connected to the processing unit 304 via input/output interfaces 340 that are coupled to the system bus 308, but may be connected by other interface and bus structures, such as a parallel port, game port, or a universal serial bus (USB).

A monitor 342 or other type of display device may also be connected to the system bus 308 via an interface, such as a video adapter 344. In addition to the monitor 342, other output peripheral devices may include components such as speakers (not shown) and a printer 346 which may be connected to computer 302 via the input/output interfaces 340.

Computer 302 may operate in a networked environment using logical connections to one or more remote computers, such as a remote computing device 348. By way of example, the remote computing device 348 may be a personal computer, portable computer, a server, a router, a network computer, a peer device or other common network node, and the like. The remote computing device 948 is illustrated as a portable computer that may include many or all of the elements and features described herein relative to computer 302.

Logical connections between computer 302 and the remote computer 348 are depicted as a local area network (LAN) 350 and a general wide area network (WAN) 352. Such networking environments are commonplace in offices, enterprise-wide computer networks, intranets, and the Internet.

When implemented in a LAN networking environment, the computer 302 is connected to a local network 350 via a network interface or adapter 354. When implemented in a WAN networking environment, the computer 302 typically includes a modem 356 or other means for establishing communications over the wide network 352. The modem 356, which may be internal or external to computer 302, may be connected to the system bus 308 via the input/output interfaces 340 or other appropriate mechanisms. It is to be appreciated that the illustrated network connections are exemplary and that other means of establishing communication link(s) between the computers 302 and 348 may be employed.

In a networked environment, such as that illustrated with computing environment 300, program modules depicted relative to the computer 302, or portions thereof, may be stored in a remote memory storage device. By way of example, remote application programs 358 reside on a memory device of remote computer 348. For purposes of illustration, application programs and other executable program components such as the operating system are illustrated herein as discrete blocks, although it is recognized that such programs and components reside at various times in different storage components of the computing device 302, and are executed by the data processor(s) of the computer.

Computer-Executable Instructions

An implementation of an exemplary exponentiator may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 3 illustrates an example of a suitable operating environment 300 in which an exemplary exponentiator may be implemented. Specifically, the exemplary exponentiator(s) described herein may be implemented (wholly or in part) by any program modules 328–330 and/or operating system 326 in FIG. 3 or a portion thereof.

The operating environment is only an example of a suitable operating environment and is not intended to suggest any limitation as to the scope or use of functionality of the exemplary exponentiator(s) described herein. Other well known computing systems, environments, and/or configurations that are suitable for use include, but are not limited to, personal computers (PCs), server computers, handheld or laptop devices, multiprocessor systems, microprocessor-based systems, programmable consumer electronics, wireless phones and equipments, general- and special-purpose appliances, application-specific integrated circuits (ASICs), network PCs, minicomputers, mainframe computers, distributed computing environments that include any of the above systems or devices, and the like.

Computer Readable Media

An implementation of an exemplary exponentiator may be stored on or transmitted across some form of computer readable media. Computer readable media may be any available media that may be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

"Communication media" typically embody computer readable instructions, data structures, program modules, or other data in a modulated data signal, such as carrier wave or other transport mechanism. Communication media also include any information delivery media.

The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-readable medium having at least one physical media and having computer-executable instructions that, when executed by a computer, perform a method to improve the speed and security of eltiptic curve exponentiation for subfield curves used in cryptography, the method comprising:

forming, with a set of coefficients ($c_i$), a Frobenius expansion of an exponent, the Frobenius expansion having a width (w);

gathering elements of the Frobenius expansion into collections of elements having matching coefficients;

merging the collections;

selecting the set of coefficients ($c_i$) from elements of $Z[\tau]$ that are congruent to odd integers modulo $2^w$; and using the elliptic curve exponentiation during generation of at least part of a cryptographic key for securing data via encryption.

2. A computer-readable medium having at least one physical media and having computer-executable instructions that, when executed by a computer, perform a method to improve the speed and security of elliptic curve exponentiation for subfield curves used in cryptography, the method comprising:

forming, with a set of coefficients ($c_i$), a Frobenius expansion of an exponent, the Frobenius expansion having a width (w);

gathering elements of the Frobenius expansion into collections of elements having matching coefficients;

merging the collections;

selecting the set of coefficients ($c_i$) from elements of $Z[\tau]$ that are congruent to odd integers modulo $2^w$, wherein $\tau^2 \pm \tau + 2 = 0$; and using the elliptic curve exponentiation during generation of at least part of a cryptographic key for securing data via encryption.

3. A computer-readable medium having at least one physical media and having computer-executable instructions that, when executed by a computer, perform a method to improve the speed and security of elliptic curve exponentiation for subfield curves used in cryptography, the method comprising:

forming, with a set of coefficients ($c_i$), a Frobenius expansion of an exponent, the Frobenius expansion having a width (w);

gathering elements of the Frobenius expansion into collections of elements having matching coefficients;
merging the collections;
selecting the set of coefficients ($c_i$) from elements of $Z[\tau]$ that are congruent to odd integers modulo $2^w$ or to the negative of odd integers modulo $2^w$;
using the elliptic curve exponentiation during generation of at least art of a cryptographic key for securing data via encryption.

4. A computer-readable medium having at least one physical media and having computer-executable instructions that, when executed by a computer, perform a method to improve the speed and security of elliptic curve exponentiation for subfield curves used in cryptography, the method comprising:
forming, with a set of coefficients ($c_i$), a Frobenius expansion of an exponent, the Frobenius expansion having a width (w);
gathering elements of the Frobenius expansion into collections of elements having matching coefficients;
merging the collections;
selecting the set of coefficients ($c_i$) from elements of $Z[\tau]$ that are congruent to odd integers modulo $2^w$, for the width w, wherein the selecting is under 2-adic homomorphism; and
using the elliptic curve exponentiation during generation of at least part of a cryptographic key for securing data via encryption.

5. A computer-readable medium having at least one physical media and having computer-executable instructions that when executed by a computer, perform a method to improve the speed and security of elliptic curve exponentiation for subfield curves used in cryptography, the method comprising:
forming, with a set of coefficients ($c_i$), a Frobenius expansion of an exponent, the Frobenius expansion having a width (w);
gathering elements of the Frobenius expansion into collections of elements having matching coefficients;
merging the collections;
wherein during the merging, simultaneously performing multiple curve additions of points on the elliptic curve; and
using the elliptic curve exponentiation during generation of at least part of a cryptographic key for securing data via encryption.

6. A computer-readable medium having at least one physical media and having computer-executable instructions that, when executed by a computer, perform a method to improve the speed and security of elliptic curve exponentiation for subfield curves used in cryptography, the method comprising:
forming, with a set of coefficients ($c_i$), a Frobenius expansion of an exponent, the Frobenius expansion having a width (w);
gathering elements of the Frobenius expansion into collections of elements having matching coefficients;
merging the collections;
wherein during the merging, performing joint addition/subtraction of points on the elliptic curve; and
using the elliptic curve exponentiation during generation of at least part of a cryptographic key for securing data via encryption.

7. A computer-readable medium having at least one physical media and having computer-executable instructions that, when executed by a computer, perform a method to improve the speed and security of exponentiation used in cryptography, the method comprising:
gathering elements of an expansion of an exponent into collections of elements, wherein the elements of a collection have matching coefficients;
merging the collections of elements;
wherein during the merging, simultaneously performing multiple curve additions of points on an elliptic curve associated with the exponentiations; and
using the exponentiation during generation of at least part of a cryptographic key for securing data via encryption.

8. A computer-readable medium having at least one physical media and having computer-executable instructions that, when executed by a computer, perform a method to improve the speed and security of exponentiation used in cryptography, the method comprising:
gathering elements of an expansion of an exponent into collections of elements, wherein the elements of a collection have matching coefficients;
merging the collections of elements;
wherein during the merging, performing joint addition/subtraction of points on an elliptic curve associated with the exponentiation; and
using the exponentiation during generation of at least part of a cryptographic key for securing data via encryption.

9. A computer-readable medium having at least one physical media and having computer-executable instructions that, when executed by a computer, perform a method to improve the speed and security of elliptic curve exponentiation for Koblitz curves used in cryptography, the method comprising:
gathering elements of a Frobenius expansion of an exponent into collections of elements, the elements of a collection having matching coefficients,
wherein the Frobenius expansion is formed with a set of coefficients ($c_i$), powers of $\tau$, and expansion having a width (w);
merging the collections of elements;
wherein merging comprises simultaneously performing multiple curve additions of points on the elliptic curve; and
using the elliptic curve exponentiation during generation of at least part of a cryptographic key for securing data via encryption.

10. A computer-readable medium having at least one physical media and having computer-executable instructions that, when executed by a computer, perform a method to improve the speed and security of elliptic curve exponentiation for Koblitz curves used in cryptography, the method comprising:
gathering elements of a Frobenius expansion of an exponent into collections of elements, the elements of a collection having matching coefficients,
wherein the Frobenius expansion is formed with a set of coefficients ($c_i$), powers of $\tau$, and expansion having a width (w);
merging the collections of elements;
wherein merging comprises performing joint addition/subtraction of points on the elliptic curve; and
using the elliptic curve exponentiation during generation of at least part of a cryptographic key for securing data via encryption.

* * * * *